(12) United States Patent
Kearney et al.

(10) Patent No.: US 7,413,910 B2
(45) Date of Patent: *Aug. 19, 2008

(54) MULTI-WELL APPARATUS

(75) Inventors: Patrick Kearney, San Francisco, CA (US); David Clarence Hager, San Jose, CA (US); Douglas O. Keller, Lake Oswego, OR (US); Jeffrey D. Donaldson, Tigard, OR (US); Robert D. Mercer, Cornelius, OR (US); James William Leahy, San Leandro, CA (US); Micheal Morrissey, Danville, CA (US); Troy M. Swartwood, Seattle, WA (US)

(73) Assignee: Exelixis, Inc., South San Francisco, CA (US)

( * ) Notice: Subject to any disclaimer, the term of this patent is extended or adjusted under 35 U.S.C. 154(b) by 736 days.

This patent is subject to a terminal disclaimer.

(21) Appl. No.: 10/471,121

(22) PCT Filed: Mar. 8, 2002

(86) PCT No.: PCT/US02/07038

§ 371 (c)(1),
(2), (4) Date: Feb. 2, 2004

(87) PCT Pub. No.: WO02/072269

PCT Pub. Date: Sep. 19, 2002

(65) Prior Publication Data

US 2004/0115098 A1 Jun. 17, 2004

Related U.S. Application Data

(60) Provisional application No. 60/274,262, filed on Mar. 8, 2001.

(51) Int. Cl.
*G01N 1/10* (2006.01)

(52) U.S. Cl. .................................. 436/180; 422/102
(58) Field of Classification Search .................. 422/102; 436/180

See application file for complete search history.

(56) References Cited

U.S. PATENT DOCUMENTS

| 3,319,792 A | 5/1967 | Lader et al. |
| 3,405,706 A | 10/1968 | Cinqualbre |
| 3,494,351 A | 2/1970 | Horn et al. |
| 3,604,410 A | 9/1971 | Whitacre |

(Continued)

FOREIGN PATENT DOCUMENTS

DE 195 14 521 A1 10/1996

(Continued)

*Primary Examiner*—Jill Warden
*Assistant Examiner*—Natalia Levkovich
(74) *Attorney, Agent, or Firm*—McDonnell Boehnen Hulbert & Berghoff LLP

(57) ABSTRACT

A multi-well assembly (10) comprises a multi-well block (12) and a guide plate (14). The multi-well block (12) has a plurality of wells (18) each with a fluid-impermeable bottom surface (22). The guide plate (14) has a plurality of fluid passageways (34) corresponding to the wells (18) of the multi-well block (12). The guide plate (14) is configured to establish fluid communication between each well (18) and an associated fluid passageway (34) when the guide plate (14) is aligned with the multi-well block (12).

4 Claims, 6 Drawing Sheets

U.S. PATENT DOCUMENTS

| | | | |
|---|---|---|---|
| 3,696,806 A | 10/1972 | Sausse | |
| 3,730,352 A | 5/1973 | Cohen et al. | |
| 3,848,581 A | 11/1974 | Cinqualbre et al. | |
| 3,928,203 A | 12/1975 | Kremer | |
| 4,079,009 A | 3/1978 | Seiler et al. | |
| 4,245,042 A | 1/1981 | Weinstein et al. | |
| 4,304,865 A | 12/1981 | O'Brien et al. | |
| 4,483,925 A | 11/1984 | Noack | |
| 4,599,315 A | 7/1986 | Terasaki et al. | |
| 4,623,461 A | 11/1986 | Hossom et al. | |
| 4,676,256 A | 6/1987 | Golden | |
| 4,693,834 A | 9/1987 | Hossom | |
| 4,734,192 A * | 3/1988 | Champion et al. | 210/335 |
| 4,797,259 A | 1/1989 | Matkovich et al. | |
| 4,829,006 A | 5/1989 | Smith et al. | |
| 4,895,706 A | 1/1990 | Root et al. | |
| 4,902,481 A | 2/1990 | Clark et al. | |
| 4,948,564 A | 8/1990 | Root et al. | |
| 5,039,493 A | 8/1991 | Oprandy | |
| 5,047,215 A | 9/1991 | Manns | |
| 5,086,780 A | 2/1992 | Schmitt | |
| 5,108,704 A | 4/1992 | Bowers et al. | |
| 5,141,719 A | 8/1992 | Fernwood et al. | |
| 5,146,794 A | 9/1992 | Rising et al. | |
| 5,205,989 A | 4/1993 | Aysta | |
| 5,208,161 A | 5/1993 | Saunders et al. | |
| 5,264,184 A | 11/1993 | Aysta et al. | |
| 5,283,039 A | 2/1994 | Aysta | |
| 5,284,772 A | 2/1994 | Oxley | |
| 5,314,412 A | 5/1994 | Rex | |
| 5,324,483 A | 6/1994 | Cody et al. | |
| 5,364,386 A | 11/1994 | Fukuoka et al. | |
| 5,364,533 A | 11/1994 | Ogura et al. | |
| 5,364,598 A | 11/1994 | Oxley | |
| 5,417,923 A | 5/1995 | Bojanic et al. | |
| 5,441,702 A | 8/1995 | Lemieux et al. | |
| 5,464,541 A | 11/1995 | Aysta et al. | |
| 5,484,572 A | 1/1996 | Katakura et al. | |
| 5,505,721 A | 4/1996 | Leach et al. | |
| 5,620,663 A | 4/1997 | Aysta et al. | |
| 5,620,894 A * | 4/1997 | Barger et al. | 435/286.2 |
| 5,624,815 A | 4/1997 | Grant et al. | |
| 5,679,310 A | 10/1997 | Manns | |
| 5,743,312 A | 4/1998 | Pfeifer et al. | |
| 5,779,984 A | 7/1998 | Kelly et al. | |
| 5,846,493 A | 12/1998 | Bankier et al. | |
| 5,976,824 A | 11/1999 | Gordon | |
| 5,985,631 A | 11/1999 | Soman et al. | |
| 5,998,214 A | 12/1999 | Guirguis | |
| 6,054,100 A | 4/2000 | Stanchfield et al. | |
| 6,063,282 A | 5/2000 | Moulton | |
| 6,136,273 A | 10/2000 | Seguin et al. | |
| 6,159,368 A | 12/2000 | Moring et al. | |
| 6,225,079 B1 | 5/2001 | Muller | |
| 6,350,414 B1 * | 2/2002 | Ballin et al. | 422/101 |
| 6,365,378 B1 | 4/2002 | Hirota et al. | |
| 6,455,005 B1 | 9/2002 | Berray et al. | |
| D464,734 S | 10/2002 | Berna et al. | |
| 6,465,190 B1 | 10/2002 | Hirota et al. | |
| D477,416 S | 7/2003 | Roberts et al. | |
| 6,649,343 B1 | 11/2003 | Takeuchi et al. | |
| 6,814,937 B1 | 11/2004 | Hirota et al. | |
| 6,827,905 B2 | 12/2004 | Shanler | |
| 6,852,290 B2 | 2/2005 | Hager et al. | |
| 6,872,535 B2 | 3/2005 | Baum | |
| 6,896,849 B2 | 5/2005 | Reed et al. | |
| 6,939,513 B2 | 9/2005 | Berray et al. | |
| 6,943,035 B1 * | 9/2005 | Davies et al. | 436/180 |
| 7,211,224 B2 | 5/2007 | Olivier | |
| 2002/0004643 A1 | 1/2002 | Carmel et al. | |
| 2002/0125197 A1 | 9/2002 | Hager et al. | |
| 2002/0187077 A1 | 12/2002 | Berray et al. | |
| 2003/0035759 A1 | 2/2003 | Coyne et al. | |
| 2003/0143124 A1 | 7/2003 | Roberts et al. | |
| 2004/0018122 A1 | 1/2004 | Micklash et al. | |
| 2004/0033170 A1 | 2/2004 | DeWalch | |
| 2005/0226786 A1 | 10/2005 | Hager et al. | |

FOREIGN PATENT DOCUMENTS

| | | |
|---|---|---|
| EP | 0 737 467 A | 10/1996 |
| EP | 1 101 532 A | 5/2001 |
| JP | 3-500003 | 1/1991 |
| JP | 2001-186880 | 7/2001 |
| JP | 2001-186881 | 7/2001 |
| JP | 2001-343386 | 12/2001 |
| JP | 2003-527953 | 9/2003 |
| WO | 89/01966 | 3/1989 |
| WO | WO 01/13128 A | 2/2001 |
| WO | WO 01/70402 A | 9/2001 |
| WO | WO 01/70402 A2 | 9/2001 |
| WO | WO 01/70402 A3 | 9/2001 |

* cited by examiner

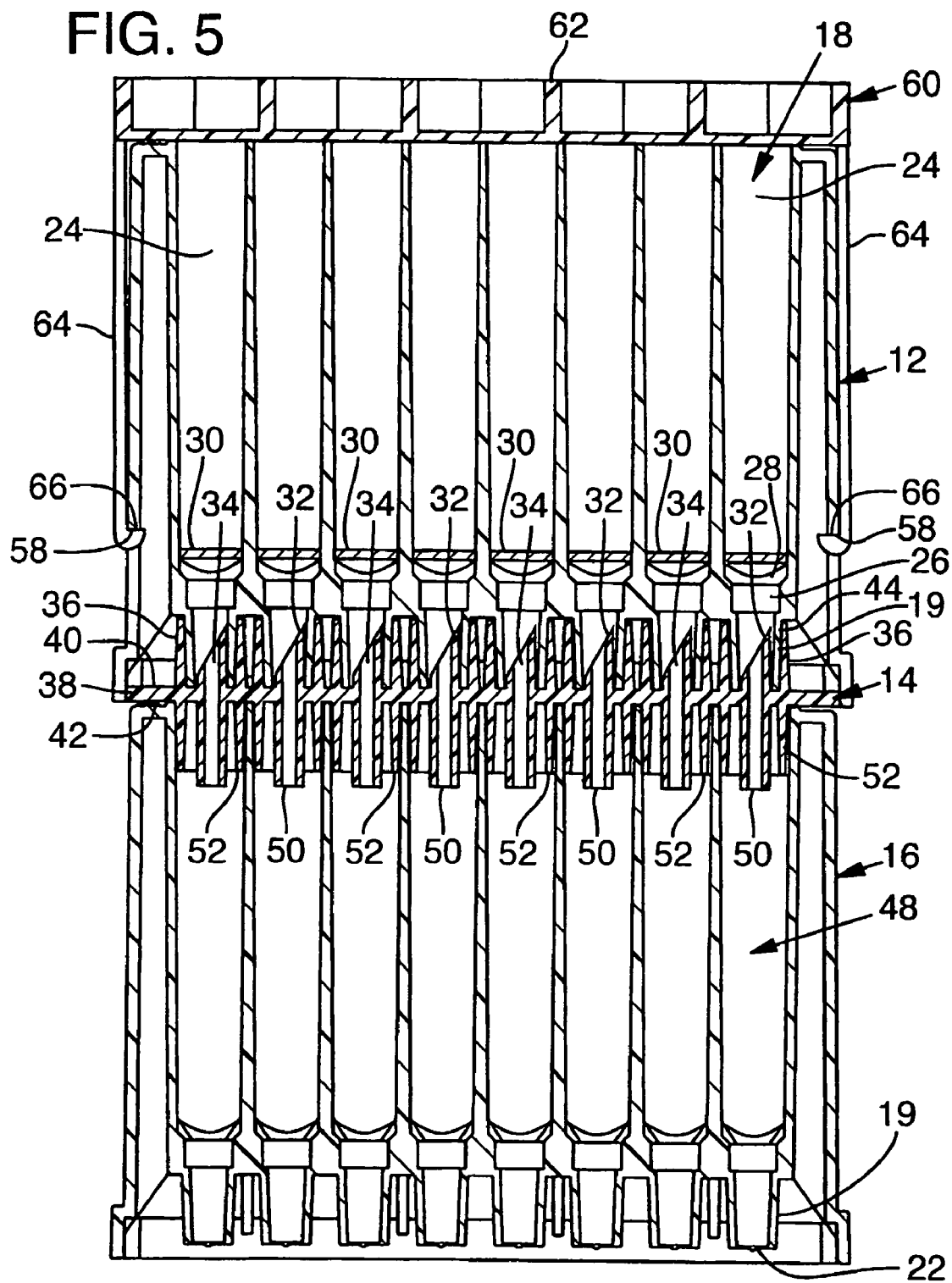

MULTI-WELL APPARATUS

CROSS-REFERENCE TO RELATED APPLICATION

This application claims priority to U.S. Provisional Application No. 60/274,262, filed on Mar. 8, 2001.

FIELD

The present invention concerns multi-well apparatus, typically useful for chemical, biological and biochemical analysis.

BACKGROUND

In recent years, various areas of research have demanded cost-effective assays and reactions of diminishing scale, increasing efficiency and accuracy, with high-throughput capacity. Multi-well devices with multiple individual wells, such as multi-well plates or multi-well blocks, are some of the most commonly used tools to carry out such reactions and assays. A variety of multi-well arrangements, constructed according to standardized formats, are commercially available. For example, a multi-well device having ninety-six depressions or wells arranged in a 12×8 array is a commonly used arrangement. Conventional multi-well devices may have wells with either fluid-impervious bottom surfaces to retain matter in the wells or open bottoms, in which case a receptacle plate may be placed underneath the multi-well device to collect matter flowing from the wells.

Test plates for numerous applications are well-known in the art. For example, test plates are known for use in culturing tissue samples. Other forms of test plates are adapted for carrying out chemical reactions or for use in micro-chromatography.

For applications requiring filtration, respective filters may be positioned in the wells of a multi-well device. In such applications, vacuum or pressure may be applied to facilitate filtration of fluid samples in the wells of the device. Following filtration, the fluids may be collected in individual containers or wells of a receptacle plate.

Despite these prior inventions, there exists a continuing need for new and improved multi-well apparatus and methods for their use.

SUMMARY

The present invention is directed toward aspects and features of a multi-well assembly for use in, for example, chemical, biological, and biochemical analysis.

A multi-well assembly according to one representative embodiment comprises a multi-well block and a guide plate. The multi-well block has a plurality of wells, with each well having a fluid-impermeable bottom surface. The guide plate defines a plurality of fluid passageways corresponding to the wells of the multi-well block. The guide plate is configured such that, whenever the guide plate is registered with the multi-well block, fluid communication is established between each well and an associated fluid passageway.

In an illustrated embodiment, the guide plate has a plurality of projections corresponding to the wells of multi-well block. The projections are configured to perforate the bottom surfaces of respective wells whenever the guide plate is registered with the multi-well block to allow the contents (e.g., chemicals) of each well to flow outwardly, such as under the force of gravity, through the perforated bottom surfaces of the wells and into respective fluid passageways. The fluid passageways in a disclosed embodiment comprise channels extending substantially longitudinally through the guide plate and each projection.

The multi-well assembly also may include a second multi-well block (also termed a "receptacle" block) for receiving or collecting the contents of the wells of the multi-well block. The receptacle block in particular embodiments has a plurality of wells, each of which corresponds to a respective fluid passageway of the guide plate. Thus, whenever the receptacle block is registered with the guide plate and the multi-well block, a fluid path is defined between each well of the multi-well block, a respective fluid passageway of the guide plate, and a respective well of the receptacle block. An optional cover may be provided for covering the open tops of the wells of the multi-well block.

According to another representative embodiment, a multi-well assembly comprises a first plate and a second plate. The first plate has a plurality of wells. The second plate has a plurality of upwardly extending fluid conduits, each of which is adapted to receive the contents of a well whenever the first plate is registered with the second plate. In addition, the fluid conduits may be configured such that, whenever the first plate is registered with the second plate, each fluid conduit extends upwardly into the lower portion of a respective well to receive fluid therefrom. In particular embodiments, the fluid conduits comprise projections formed with substantially longitudinally extending passageways. The second plate also may be provided with an upwardly extending wall circumscribing each fluid conduit. The walls are configured such that, whenever the first plate is registered with the second plate, each wall matingly fits around the lower portion of a respective well to minimize cross-contamination between adjacent wells.

In another representative embodiment, a multi-well device includes a plurality of wells, with each well having a fluid-impervious lower surface. A guide tray has a plurality of fluid passageways that correspond to the wells of the multi-well device. The guide tray also has means for fluidly connecting each fluid passageway with a corresponding well whenever the guide tray is registered with the multi-well device.

According to yet another representative embodiment, a guide plate for use with a multi-well device comprises a body having upper and lower major surfaces. A plurality of projections depend from the upper major surface and a plurality of outlet spouts depend from the lower major surface below the projections. Extending through each projection and outlet spout is a fluid passageway or channel. In a disclosed embodiment, an upwardly extending wall surrounds each projection and is configured to matingly fit around the lower portion of a well of the multi-well device whenever the guide plate is registered with the multi-well device. In addition, each projection may be formed with a cutting surface that is configured to perforate the bottom surface of a well whenever the guide plate is registered with the multi-well device.

According to another representative embodiment, a guide plate for use with a multi-well device comprises a body having first and second major surfaces. A plurality of projections depend from one of the first and second major surfaces. Each projection is configured to perforate the bottom surface of a well of the multi-well device whenever the guide plate is registered with the multi-well device. In particular embodiments, the projections are shaped in the form of an ungula (i.e., a cylindrical or conical section formed by intersecting a cylinder or cone with one or more planes oblique to its base) and may be formed with a longitudinally extending channel.

In another representative embodiment, a method of carrying out multiple chemical reactions comprises providing a multi-well device having a plurality of wells with fluid-impervious bottom surfaces and a guide plate defining a plurality of passageways corresponding to the wells. Reagents for the chemical reactions may be introduced into the wells of the multi-well device. Upon completion of the chemical reactions, the guide plate may be registered with the multi-well device so that the bottom of each well is in flow-through communication with a passageway in the guide plate. Thus, the products of the chemical reactions are permitted to flow through the passageways and, if a receptacle plate is provided, into corresponding wells of the receptacle plate.

These and other features of the invention will be more fully appreciated when the following detailed description of the invention is read in conjunction with the accompanying drawings.

BRIEF DESCRIPTION OF THE DRAWINGS

FIG. 5 is a vertical section of the multi-well assembly of FIG. 1, shown with a cover installed on the upper multi-well block and filters positioned in each well.

DETAILED DESCRIPTION

Figure 1:
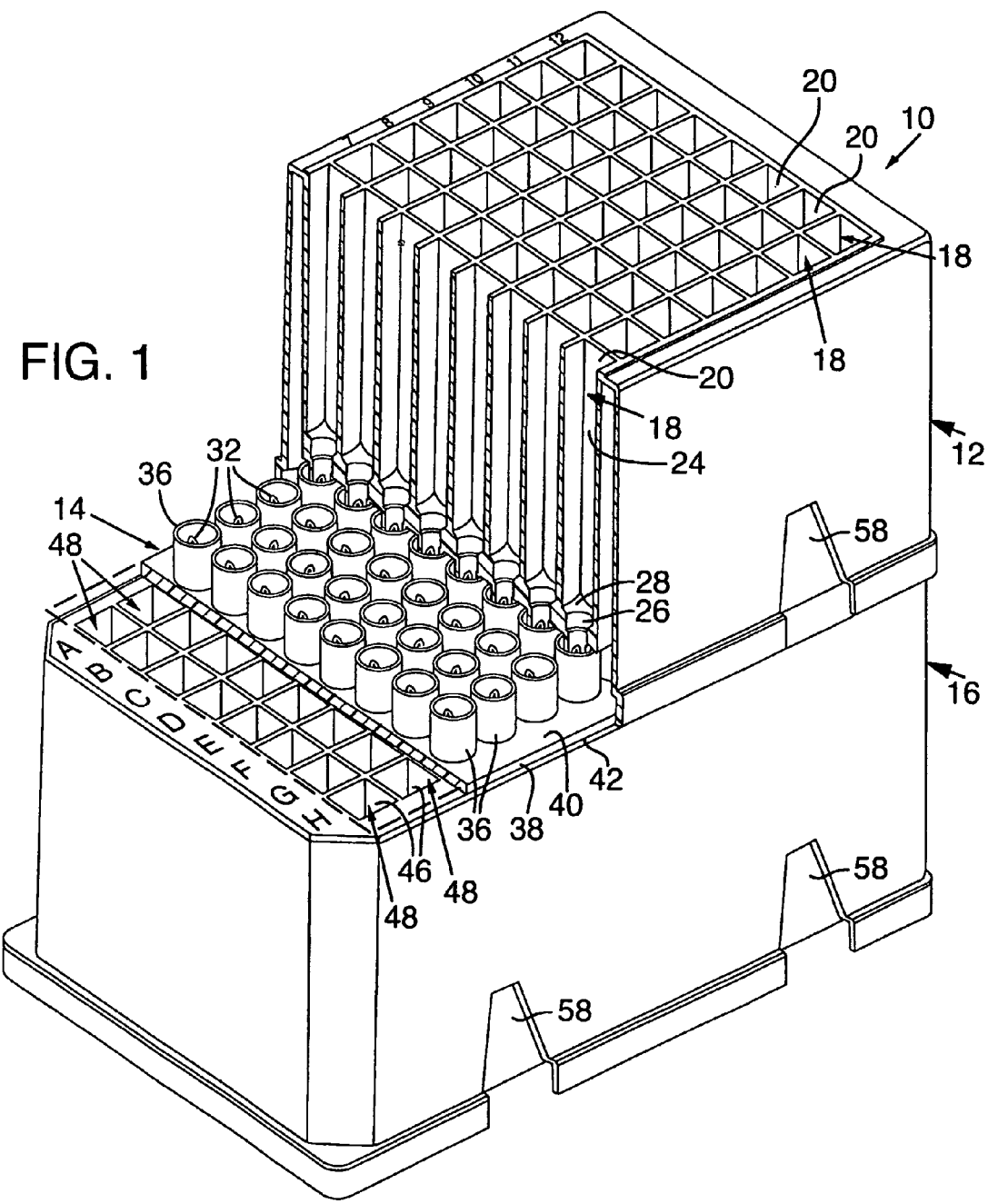
FIG. 1 is a perspective view of a multi-well assembly, according to one embodiment, shown with a portion of the upper multi-well block broken away to show the upper surface of the guide plate, and with a portion of the guide plate broken away to show the wells of the lower multi-well block.

Referring initially to FIG. 1, there is shown a multi-well assembly, indicated generally at 10, according one embodiment. Generally, the assembly 10 comprises a first multi-well block 12, a guide plate, or tray, 14 situated below the first multi-well block 12, and a second multi-well block 16 (also termed a "receptacle block") situated below the guide plate 14. In use, chemical or biological matter is introduced into the first multi-well block 12 for carrying out any of various chemical, biological, and biochemical reactions and processes. The second multi-well block 16 serves as a receptacle block for receiving chemical or biological matter from the first multi-well block 12, as described in greater detail below.

Figure 2:
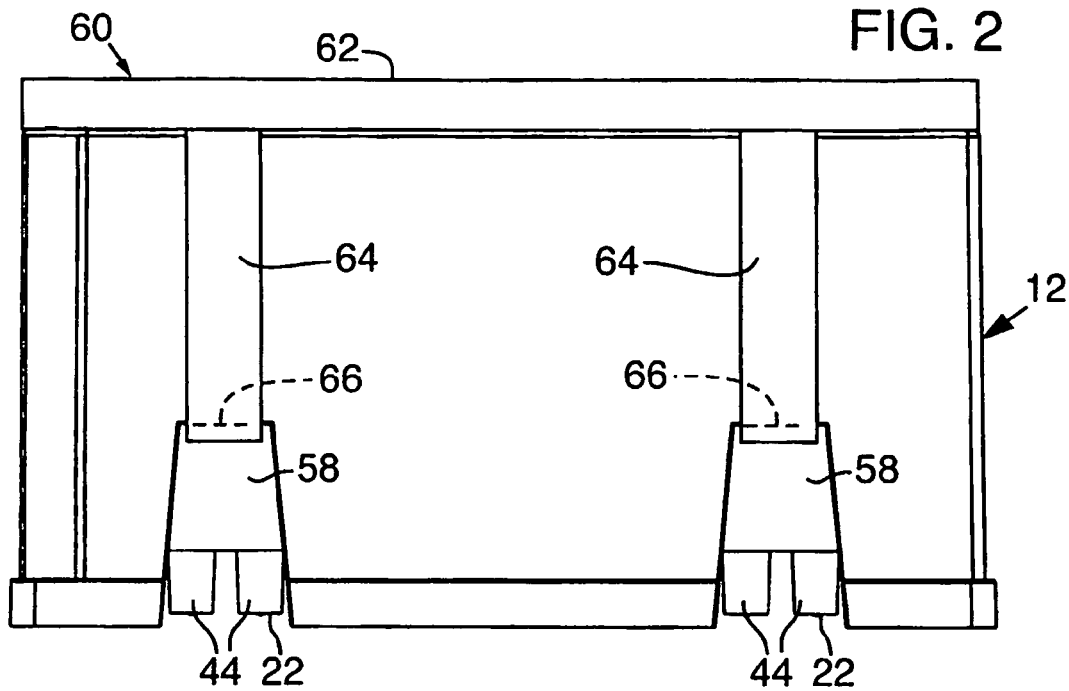
FIG. 2 is a side elevation view of the upper multi-well block of the multi-well assembly of FIG. 1, shown with a cover covering the open tops of the wells.
Figure 4:
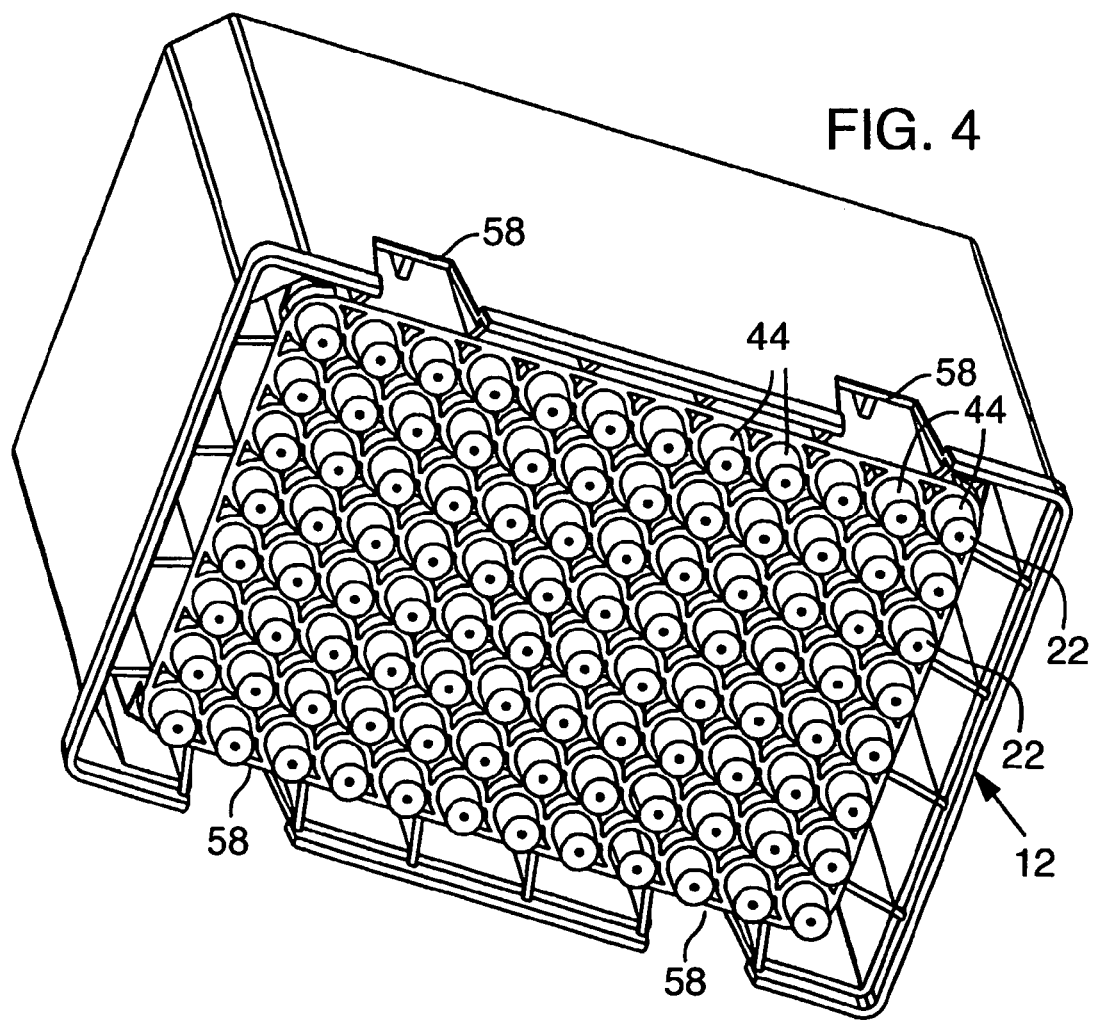
FIG. 4 is a bottom perspective view of the upper multi-well block of FIG. 1.
Figure 3:
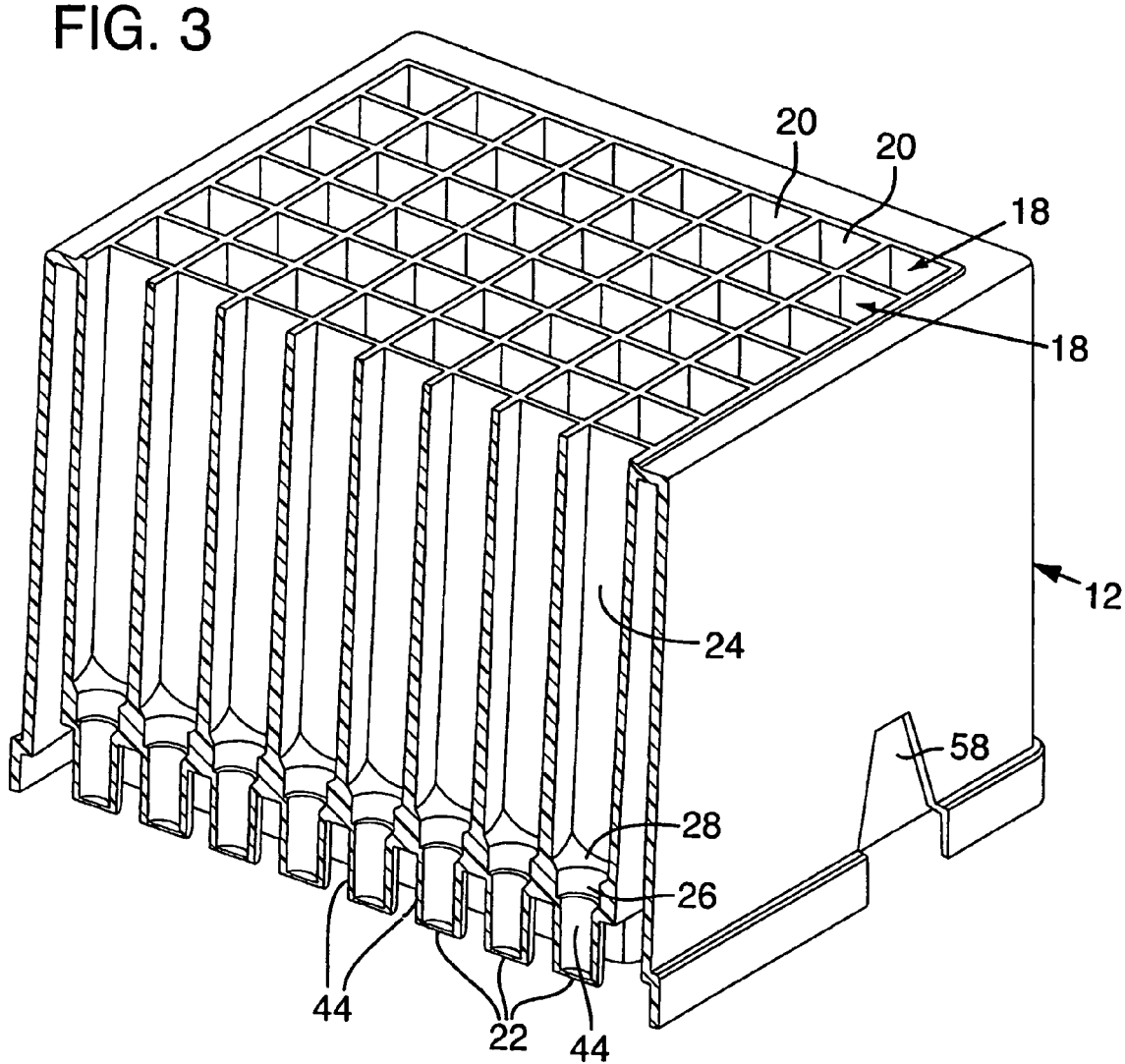
FIG. 3 is a perspective, sectional view of the upper multi-well block of FIG. 1.
Figure 6:
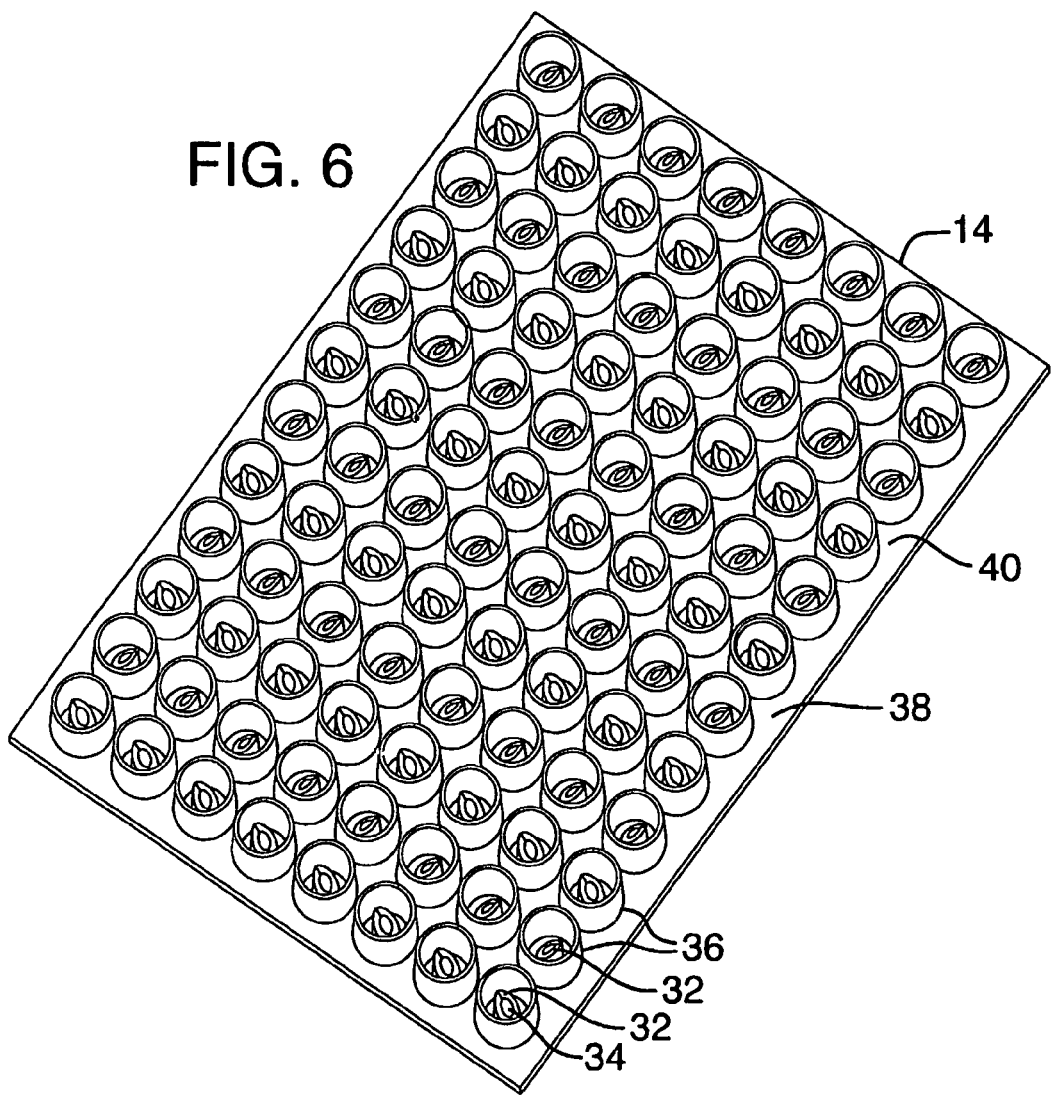
FIG. 6 is a top perspective view of the guide plate of the multi-well assembly of FIG. 1.

Referring also to FIGS. 2-4, the first multi-well block 12 in the illustrated configuration has, as its name suggests, a generally rectangular block-like shape and supports a 8×12 array of vertically disposed, elongated wells, or cavities, 18. Such a 96-well array, with specific (i.e., 9 mm) center-to-center spacing is a standard configuration for many commercially available multi-well test plates. The overall dimensional area of the first multi-well block 12, as well as the guide plate 14 and the second multi-well block 16, provide for a footprint of the same size as a standard 96-well plate to permit use with standard equipment holders, well washers, and the like.

Although in the illustrated embodiment the first multi-well block 12 is shown as having a generally block-like shape, the first multi-well block 12 may be generally cylindrical in shape or have any of various other geometric shapes. In addition, any number of wells 18 and any arrangement of wells 18 may be used. For example, without limitation, other possible arrays of wells 18 include a 4×6 array and a 6×8 array. Although less desirable, in other embodiments, the first multi-well block 12 may support wells 18 that are not arranged in an ordered array. In still other embodiments, wells that are substantially shallower in depth than those of the illustrated embodiment may be used, in which case the first multi-well block 12 will have more of a plate-like configuration, rather than the illustrated block-like shape. The wells 18 may be configured to support volumes, for example, from about 100 μL to several mL per well, although wells having a larger or smaller volumetric capacity also may be used. In working embodiments, the wells 18 are configured to hold about 2 mL to 3 mL per well.

The illustrated wells 18 have open tops 20 (FIGS. 1 and 3) and fluid-impermeable barriers 22 (FIGS. 3 and 4) that serve as bottom surfaces for the wells 18. As best shown in FIGS. 3 and 5, each well 18 has a generally rectangular (in the vertical direction) upper portion 24, a cylindrical intermediate portion 26, and a cylindrical lower portion 44. As shown, the upper portion 24 and lower portion 44 of each well 18 may be slightly tapered so that their cross-sectional profile exhibits decreasing width from top to bottom. The lower end of each lower potion 44 is covered or sealed by the respective fluid barrier 22 (FIGS. 2 and 4). In addition, as shown in FIGS. 3 and 5, the upper portion 24 of each well 18 may be formed with a curved bottom surface 28 to prevent the contents of the well 18 from settling in the upper portion 24. In alternative embodiments, the well 18 may have any of various other configurations. For example, an upper portion 24 may have a circular transverse cross-section or square-shaped transverse cross-section with rounded corners. Alternatively, the wells 18 may be provided with a constant cross-sectional shape along their entire lengths.

In addition, in still other embodiments, the barriers 22 may be displaced upward from the bottom edges of the lower portions 44. For example, the barriers 22 may be positioned within the intermediate portions 26 or the lower portions 44 of the wells 18. In any event, the barriers 22 serve to retain matter (e.g., chemicals) introduced into the respective wells 18.

The barriers 22 desirably are about 0.005 to 0.015 inch thick, with 0.010 inch being a specific example, although thinner or thicker barriers 22 can be used. In other embodiments, the barriers 22 may have a variable thickness. For example, a barrier 22 may have a convex shape so that its thickness is greatest at its center, or alternatively, a concave shape so that its thickness is greatest at its periphery.

Figure 9:
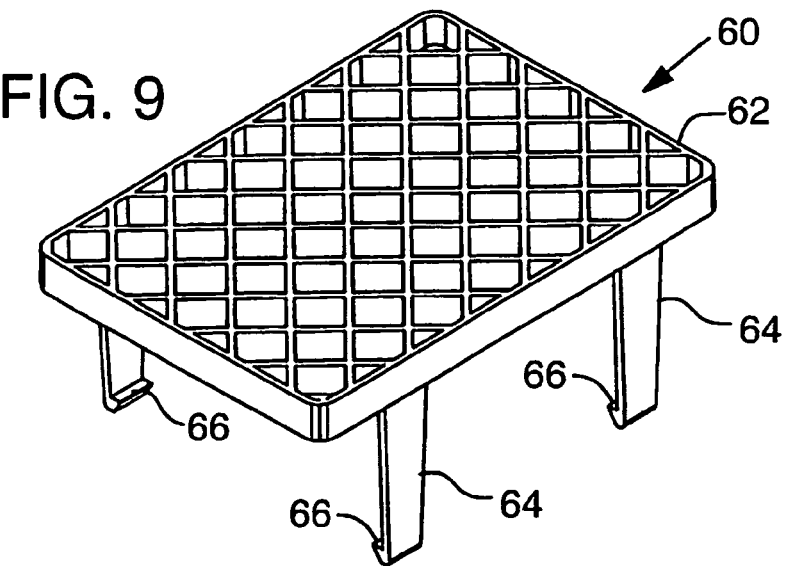
FIG. 9 is a perspective view of the cover of FIG. 2.

Referring to FIGS. 2, 5, and 9, an optional cover or lid 60 may be provided for covering the open tops 20 of the wells 18. The cover 60 in the configuration shown comprises a fluid-impermeable top portion 62 and legs 64 that extend downwardly from opposing sides of the top portion 62. The bottom of each leg 64 forms an inwardly extending latch 66 that is dimensioned to fit within a corresponding notch 58 defined in a side of the first multi-well block 12 (FIGS. 2 and 5). The legs 62 desirably are made from a semi-flexible material to permit slight bending or flexing of the legs 62 when installing or removing the cover 60. A sealing member, such as a flat gasket (not shown), may be positioned between the open tops 20 and the cover 60 to ensure a fluid-tight seal. To remove the cover 62, the bottom ends of legs 64 are pulled away from the sides of the multi-well block 12 until the latch portions 66 are removed from their associated notches 58, at which point the cover 62 can be lifted away from the multi-well block 12.

Referring again to FIG. 1, the second multi-well block 16, like the first multi-well block 12, has an ordered array of wells 48, each corresponding to a respective well 18 of the first multi-well block 12. The guide plate 14 is configured to direct the flow of matter from the wells 18 of the first multi-well block 12 to corresponding wells 48 of the second multi-well block 16, as described below. In the illustrated embodiment, the second multi-well block 16 has the same construction as the first multi-well block 12, however, this is not a requirement. For example, if the first multi-well block 12 and the guide plate 14 conform to a standardized format, such as the illustrated 96-well format, any suitable commercially available receptacle block may be used in lieu of the illustrated second multi-well block 16.

Referring to FIGS. 5-8, the guide plate 14, in the illustrated configuration, comprises a body 38 having an upper major surface 40 and a lower major surface 42. The guide plate 14 has an ordered array of upwardly extending fluid conduits in the form of projections 32, each of which corresponds to a respective well 18 of the first multi-well block 12. The guide plate 14 also may have an ordered array of downwardly extending outlet spouts 50 located below respective projections 32. The guide plate 14 is formed with respective bores, or channels, 34 extending through each projection 32 and outlet spout 50.

Figure 8:
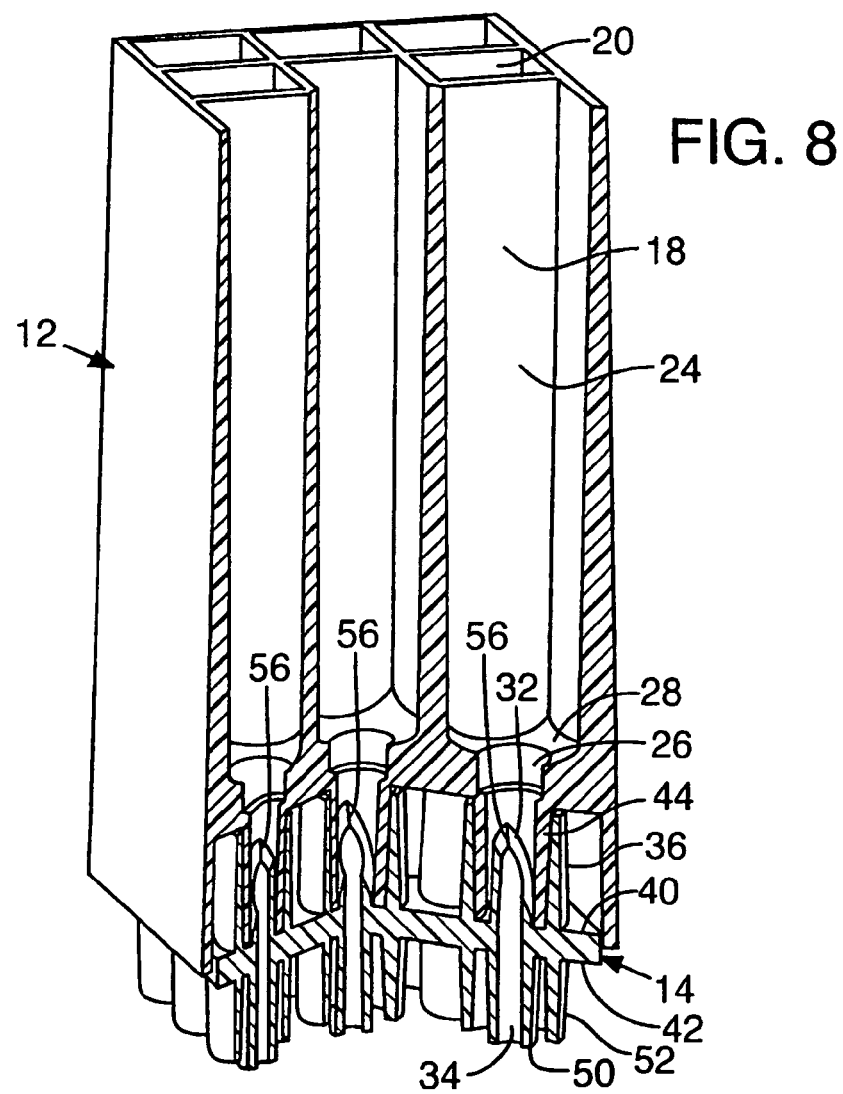
FIG. 8 is an enlarged perspective view of a portion of the upper multi-well block, shown partially in section, and a portion of the guide plate, shown partially in section, in which the wells of the upper multi-well block are registered with corresponding fluid conduits of the guide plate.

The projections 32 are configured to perforate the respective barriers 22 to allow the contents of each well 18 to flow outwardly therefrom whenever guide plate 14 is registered with the first multi-well block 12 (as shown in FIGS. 5 and 8). As used herein, to "register" the guide plate 14 with the first multi-well block 12 means to align each projection 32 with the respective barrier 22 of a corresponding well 18 and to press together the guide plate 14 and the first multi-well block 12 until the projections 32 extend into the respective lower portions 44 of the wells 18. Likewise, the second multi-well block 16 can be registered with the guide plate 14 by aligning the open tops of the wells 48 with corresponding outlet spouts 50 of the guide plate 14 and pressing the guide plate 14 and the second multi-well block 16 together so that the outlet spouts 50 extend into the respective wells 48 (FIG. 5).

Figure 7:
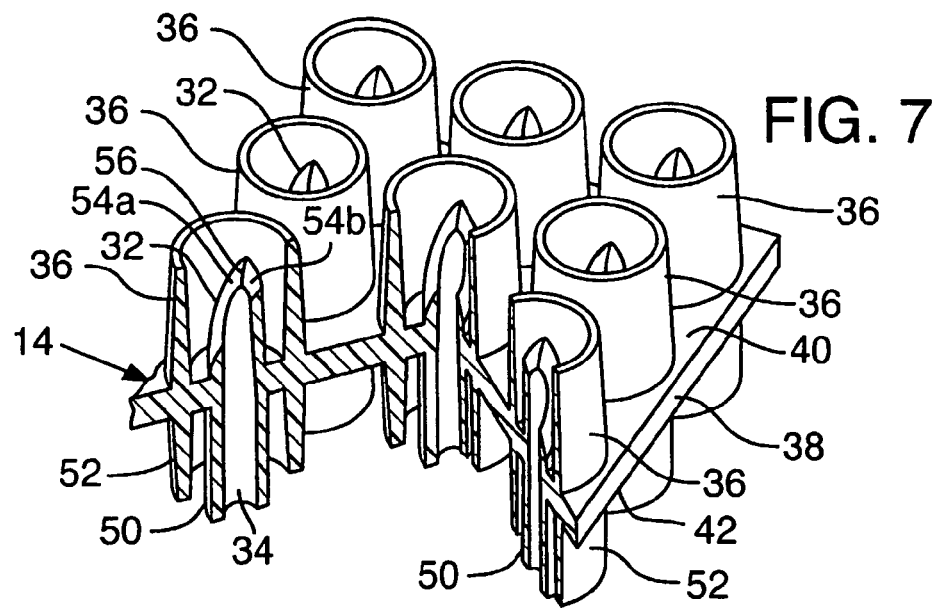
FIG. 7 is an enlarged perspective view of a portion of the guide plate shown partially in section.

As best shown in FIG. 7, the shape of each projection 32 in the illustrated embodiment is that of a cylindrical section formed by intersecting a cylinder with two planes oblique to the base of the cylinder in the manner shown. Thus, two flat, upwardly angled surfaces 54a, 54b are provided that converge at the top, or crest, of the projection 32 to form a cutting edge 56. The cutting edge 56 is positioned to cut through a respective barrier 22 whenever the guide plate 14 and the first multi-well block 12 are pressed together. Other forms for the projections 32 alternatively may be used. For example, the projections 32 may be shaped in the form of a cone, a cylinder, or any variation thereof, and may or may not be provided with a cutting edge, such as shown in FIG. 7, to facilitate perforation of the barriers 22.

In alternative embodiments, the barriers 22 may be coupled to the lower portions 44 of the wells 18 in a manner that allows the barriers to be removed from sealing the bottom of their respective wells 18 without being perforated or otherwise damaged whenever the guide plate 14 is registered with the first multi-well block 12. For example, a barrier 22 may be hingedly connected to a lower portion 44 such that the barrier 22 remains in a normally closed position for retaining the contents of the well 18 whenever the first multi-well block 12 is not registered with the guide plate 14. The hinged barrier 22 is caused to move to an open position by a respective projection 32 to permit the contents of the well 18 to escape therefrom whenever the first multi-well block 12 is registered with the guide plate 14. The barrier 22 in this configuration may be biased toward its normally closed position so that it automatically closes or seals the lower portion 44 whenever the guide plate 14 is detached from the first multi-well block 12.

In another embodiment, a barrier 22 may be configured such that it is normally biased in a closed position and is caused to move upwardly through a lower portion 44 by a respective projection 32 whenever the first multi-well block 12 is registered with the guide plate 14. In this configuration, the lower portion 44 is tapered from top to bottom so that an opening is created between the periphery of the barrier 22 and the inner surface of the lower portion 44 as the barrier is moved in an upward direction by the respective projection 32.

In the embodiment shown in FIGS. 5-8, each projection 32 is circumscribed by an upper wall 36 depending from the upper major surface 40 of the guide plate 14. Each outlet spout 50 is similarly circumscribed by a lower wall 52 depending form the lower major surface 42. As shown in FIGS. 5 and 8, whenever the guide plate 14 is registered with the first multi-well block 12, each upper wall 36 of the guide plate 14 matingly fits around the lower portion 44 of a corresponding well 18. This provides for a substantially fluid-tight passageway extending between each well 18 and corresponding channel 34 to substantially reduce cross-contamination between adjacent wells 18. In addition, each lower wall 52 is dimensioned to fit within an open top 46 of a corresponding well 48 of the second multi-well block 16. Thus, whenever the first multi-well block 12, the guide plate 14, and the second multi-well block 16 are assembled in the manner shown in FIG. 5, the contents of each well 18 of the multi-well block 12 are allowed to flow through the channels 34 of the guide plate 14 into corresponding wells 48 of the receptacle block 16.

Guide-plate and projection configurations other than the illustrated configurations also may be used. For example, in alternative embodiments, one or more channels may be formed in the guide plate 14 in the space between each projection 32 and its respective upper wall 36, rather than through the projections 32 themselves, to permit the contents of the wells 18 to flow through the guide plate 14 whenever the guide plate 14 is registered with the first multi-well block 12. In still other embodiments, the upper walls 36 are dimensioned to be inserted into respective lower portions 44 of the wells 18.

As shown in FIG. 5, optional filters 30 may be positioned within the wells 18 of the first multi-well block 12 to filter chemicals or other matter introduced into the wells 18. Alternatively, filters (not shown) can be positioned in the channels 34 of the guide plate 14 and/or in the wells 48 of the second multi-well block 16. The filters 30 may comprise any suitable material, such as, for example, polypropylene, polyethylene, glass fiber, and the like.

The first multi-well block 12, the guide plate 14, the second multi-well block 16, and the cover 60 desirably are formed of a substantially rigid, water-insoluble, fluid-impervious material that is chemically non-reactive with the matter to be introduced into the multi-well assembly 10. The term "substantially rigid" as used herein is intended to mean that the material will resist deformation or warping under light mechanical or thermal load. Suitable materials include, without limitation, polystyrene, polyethylene, polypropylene, polyvinylidine chloride, polytetrafluoroethylene (PTFE), polyvinyledenefluoride (PVDF), glass-impregnated plastics, and stainless steel, among others. In working embodiments, polypropylene is used because it is easily amenable to varying temperature and pressure conditions, and is easy to fabricate.

The first multi-well block 12, the guide plate 14, the second multi-well block 16, and the cover 60 may be formed by any suitable method. For example, using conventional injection-molding techniques, each component of the assembly 10 (i.e., the first multi-well block 12, the guide plate 14, the second multi-well block 16, and the cover 60) can be formed as a unitary structure. In an alternative approach, various parts of each component may be formed and bonded together using conventional thermal-bonding techniques. For example, the wells 18 and/or the barriers 22 can be separately formed and subsequently thermally bonded together to form the first multi-well block 12.

The multi-well assembly 10 may be used in any of various chemical, biological, and biochemical reactions and processes such as, without limitation, solution-phase or solid-phase chemical synthesis and reactions, protein-derivitization assays, protein-caption assays, biotinylation and fluorescence labeling assays, magnetic separation assays, chromatography, and culturing of microorganisms, among others. The processes in the assembly 10 may be carried out at room temperature, below room temperature, or above room temperature. In addition, the assembly 10 supports multiple simultaneous reactions.

In using the multi-well assembly 10 for, for example, carrying out multiple chemical reactions, reagents are introduced into the wells 18 of the first multi-well block 12, using, for example, a multi-channel pipette. In this manner, the first multi-well block 12 serves as a "reaction block" for carrying out the multiple chemical reactions. As previously mentioned, the barriers 22 serve to retain the reagents in the wells 18 during the reaction step. If desired, the cover 60 may be placed on the first multi-well block 12 to prevent the escape of gases through the open tops 20 of the wells 18 as the reactions occur, and/or to prevent contamination or cross-contamination of the reactions.

Upon completion of the reaction step, the bottom of each well 18 is mated and coaxially aligned with a respective upper wall 36 of the guide plate 14, and each well 48 of the second multi-well (receptacle) block 16 is mated and aligned with a respective lower wall 52 of the guide plate 14. The first multi-well block 12, the guide plate 14, and the receptacle block 16 may then be placed in a conventional pressing apparatus (not shown). The pressing apparatus is operated to press the assembly together to cause the projections 32 to perforate the respective barriers 22, thereby allowing the reaction products in each well 18 to flow through the channels 34 of the guide plate 14 and into the respective wells 48 of the receptacle block 16 for analysis and/or storage.

In specific working embodiments, the assembly 10 is configured such that about 5 lb to 15 lb of force per well 18 during pressing is sufficient to cause the projections 32 to perforate the barriers 22, although this is not a requirement. In other embodiments, the assembly 10 may be configured to allow a user to register the first multi-well block 12, the guide plate 14, and the receptacle block 16 without the use of a pressing apparatus.

After pressing, conventional techniques may be used to facilitate removal of the contents of the wells 18. For example, the assembly 10 may be centrifuged, or a pressure differential may be created across the assembly 10, as well known in the art. A pressure differential may be created by, for example, applying positive pressure from a compressed-gas source (e.g., compressed air) to the wells 18 of the first multi-well block 12 or, alternatively, applying a vacuum to the wells 48 of the receptacle block 16.

After the reaction products are removed from the receptacle block 16, the assembly 10 may be cleaned and re-used in another process. If desired, the bottom of the wells 18 may be re-sealed by, for example, welding a mat of suitable material (e.g., polypropylene) to the bottom of the wells 18. Otherwise, the first multi-well block 12 may be used as is, that is, without any barriers 22 in place to retain matter introduced into the wells 18.

In addition, in other methods of use, after executing a first reaction step, the receptacle block 16 may be used to perform a subsequent reaction or processing step, and additional chemicals or reagents may be introduced into the wells 48. Thereafter, the receptacle block 16 can be registered with another guide plate 14 and receptacle block 16 in the manner described above. In this manner, the receptacle block 16 is used as a reaction block in the subsequent reaction or processing step.

The invention has been described with respect to particular embodiments and modes of action for illustrative purposes only. The present invention may be subject to many modifications and changes without departing from the spirit or essential characteristics thereof. We therefore claim as our invention all such modifications as come within the scope of the following claims.

We claim:

1. A method of carrying out multiple chemical reactions, the method comprising:
   providing a multi-well device comprising a plurality of wells having fluid-impervious bottom surfaces;
   providing a guide plate defining a plurality of passageways corresponding to the wells;
   introducing reagents into the wells to initiate respective chemical reactions in the wells; and
   registering the guide plate with the multi-well device so that each well is in flow-through communication with a respective passageway to permit products of the respective chemical reactions to flow through the passageways,
   wherein the guide plate has a plurality of upwardly extending projections that open the fluid-impervious bottom surfaces of the plurality of wells whenever the guide plate is registered with the multi-well device, and wherein registering the guide plate with the multi-well device comprises pressing the guide plate and the multi-well device together using a pressing apparatus.

2. The method of claim 1, further comprising registering a multi-well receptacle plate comprising a plurality of wells with the guide plate to collect the products of the chemical reactions flowing from the passageways.

3. The method of claim 1, further comprising providing respective filters in the wells for filtering the reagents.

4. The method of claim 1, further comprising creating a pressure differential across the passageways to facilitate the flow of the respective products of the respective chemical reactions through the passageways.

* * * * *